United States Patent
Mallis et al.

(10) Patent No.: US 11,570,201 B2
(45) Date of Patent: Jan. 31, 2023

(54) SYSTEM AND METHOD FOR DETECTING AND BLOCKING MALICIOUS ATTACKS ON A NETWORK

(71) Applicant: SECURING SAM LTD., Tel Aviv (IL)

(72) Inventors: Omri Mallis, Tel Aviv (IL); Eilon Lotem, Tel Aviv (IL); Dima Krasner, Tel Aviv (IL)

(73) Assignee: Securing SAM Ltd., Tel Aviv (IL)

(*) Notice: Subject to any disclaimer, the term of this patent is extended or adjusted under 35 U.S.C. 154(b) by 217 days.

(21) Appl. No.: 17/031,083

(22) Filed: Sep. 24, 2020

(65) Prior Publication Data

US 2021/0099481 A1 Apr. 1, 2021

Related U.S. Application Data (60) Provisional application No. 62/906,175, filed on Sep. 26, 2019.

(51) Int. Cl.
*H04L 29/06* (2006.01)
*H04L 9/40* (2022.01)

(52) U.S. Cl.
CPC ...... *H04L 63/1441* (2013.01); *H04L 63/0236* (2013.01); *H04L 63/0245* (2013.01); *H04L 63/0263* (2013.01); *H04L 63/1416* (2013.01)

(58) Field of Classification Search
CPC ............ H04L 63/1441; H04L 63/0236; H04L 63/0245; H04L 63/0263; H04L 63/1416
See application file for complete search history.

(56) References Cited

U.S. PATENT DOCUMENTS

| | | | | |
|---|---|---|---|---|
| 7,853,689 B2* | 12/2010 | Enderby | ............... | G06F 21/554 |
| | | | | 709/224 |
| 10,491,611 B2* | 11/2019 | Caldwell | ............ | H04L 61/4511 |
| 2014/0075554 A1* | 3/2014 | Cooley | ............... | H04L 63/0245 |
| | | | | 726/22 |
| 2015/0150073 A1* | 5/2015 | Bhalerao | ............ | H04L 63/0272 |
| | | | | 726/1 |

(Continued)

FOREIGN PATENT DOCUMENTS

| | | |
|---|---|---|
| EP | 3506596 | 7/2019 |
| WO | WO 2019/175868 | 9/2019 |

OTHER PUBLICATIONS

European Search report for Application No. EP20198224.6, dated Dec. 3, 2020.

(Continued)

*Primary Examiner* — Kambiz Zand
*Assistant Examiner* — Afaq Ali
(74) *Attorney, Agent, or Firm* — Greenberg Traurig, LLP (57) ABSTRACT

Systems and method of detecting and blocking malicious attacks on a computer network, including: receiving, by a memory constrained gateway in communication with the computer network, a communication request from at least one device, identifying the type of the at least one device based on the received communication request, verifying that the device is of an allowed type from a predetermined list of allowed device types, checking at least one signature of the received communication request of the allowed device to detect malicious signatures, and blocking communication requests from devices with at least one malicious signature.

18 Claims, 6 Drawing Sheets

(56) References Cited

U.S. PATENT DOCUMENTS

2016/0352685 A1    12/2016  Park
2021/0006583 A1*    1/2021  Ryabenkiy .......... H04L 63/1425

OTHER PUBLICATIONS

Thien Duc Nguyen, Samuel Marchal, Markus Miettinen, Hossein Fereidooni, N. Asokan, Ahmad-Reza Sadeghi "DÏoT: A Federated Self-learning Anomaly Detection System for IoT" Proceedings of the 39th IEEE International Conference on Distributed Computing Systems (ICDCS), 2019.

* cited by examiner

SYSTEM AND METHOD FOR DETECTING AND BLOCKING MALICIOUS ATTACKS ON A NETWORK

This application claims the benefit of U.S. Provisional Application No. 62/906,175, filed Sep. 26, 2019, which is incorporated by reference.

FIELD OF THE INVENTION

The present invention relates to data communication in a computer network. More particularly, the present invention relates to systems and methods for securing computing devices in a computer network.

BACKGROUND

Internet of Things (IoT) devices, for example electric appliances connected to a home Wi-Fi network, often carry security vulnerabilities, that are exploitable by remote hosts. As the number of connected IoT devices grow, home networks become more vulnerable. Specifically, IoT devices often include application programming interfaces (APIs) for controlling them, in the form of network services. Those services are often found to be vulnerable to attacks, and software updates are many times delayed or not done at all. It can therefore be important to detect and block these attacks by inspection of communication traffic.

Inspection of data packets from communication traffic using deep packet inspection (DPI) is a known concept including classification of network traffic to different streams, searching the traffic for malicious activity, and blocking the traffic if such an activity is found. It is usually used to detect and/or block attack attempts against network connected devices (e.g., printers, laptops, etc.). DPI is usually employed on highly capable hardware in medium-sized to enterprise networks having substantial processing resources, such that smaller networks (e.g., in a household) are typically left unprotected.

SUMMARY

There is thus provided, in accordance with some embodiments of the invention, a method of detecting and blocking malicious attacks on a computer network, the method including: receiving, by a memory constrained gateway in communication with the computer network, a communication request from at least one device, identifying, by the gateway, a type of the at least one device based on the received communication request, verifying, by the gateway, that the device is of an allowed type from a predetermined list of allowed device types, checking, by the gateway, at least one signature of the received communication request of the allowed device to detect malicious signatures, and blocking, by the gateway, communication requests from devices with at least one malicious signature. In some embodiments, the at least one signature is determined as malicious when the at least one signature appears in a malicious signature database coupled to the gateway. In some embodiments, the predetermined list includes device types that are allowed to communicate with the computer network.

In some embodiments, data of the received communication request is checked to correspond to at least one allowed device. In some embodiments, the data of the received communication request is checked for at least one of port number of the at least one device and origin of communication. In some embodiments, the gateway blocks communication to devices unidentified with an allowed type. In some embodiments, the gateway receives at least one communication rule corresponding to the identified type, where the received at least one communication rule includes at least one condition for inspection, the at least one condition for inspection including information from a group consisting of: known vulnerabilities for the identified type, protocol of the at least one device, port number of the at least one device, origin of communication, number of bytes to inspect for each session, predefined signature and priority of the at least one communication rule.

In some embodiments, the at least one communication rule is retrieved from a server in communication with the computer network. In some embodiments, the at least one communication rule is deleted once the communication with the at least one device stops. In some embodiments, the communication request is received at a gateway server of the computer network. In some embodiments, hardware acceleration is initiated. In some embodiments, automatic deep packet inspection of the received communication request is performed.

There is thus provided, in accordance with some embodiments of the invention, a system for detection of malicious attacks on a computer network, the system including: a memory constrained gateway in communication with the computer network, and a malicious signature database coupled to the gateway, where the gateway is configured to: receive a communication request from at least one device, identify a type of the at least one device based on the received communication request, verify that the device is of an allowed type from a predetermined list of allowed device types, check at least one signature of the received communication request of the allowed device to detect malicious signatures. In some embodiments, the at least one signature is determined as malicious when the at least one signature appears in the malicious signature database. In some embodiments, communication requests from devices with at least one malicious signature are blocked, where the predetermined list includes device types that are allowed to communicate with the computer network.

In some embodiments, the gateway is further configured to check if data of the received communication request corresponds to at least one allowed device. In some embodiments, the data of the received communication request is checked for at least one of port number of the at least one device and origin of communication. In some embodiments, the gateway is further configured to block communication to devices unidentified with an allowed type. In some embodiments, the gateway is further configured to receive at least one communication rule corresponding to the identified type, where the received at least one communication rule includes at least one condition for inspection, where the at least one condition for inspection includes information from a group consisting of: known vulnerabilities for the identified type, protocol of the at least one device, port number of the at least one device, origin of communication, number of bytes to inspect for each session, predefined signature and priority of the at least one communication rule.

In some embodiments, the gateway is further configured to retrieve the at least one communication rule from a server in communication with the computer network. In some embodiments, the gateway is further configured to delete the at least one communication rule once the communication with the at least one device stops. In some embodiments, the communication request is received at a gateway server of the computer network. In some embodiments, the gateway is further configured to initiate hardware acceleration. In some embodiments, the gateway is further configured to perform automatic deep packet inspection of the received communication request.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

Figure 1:
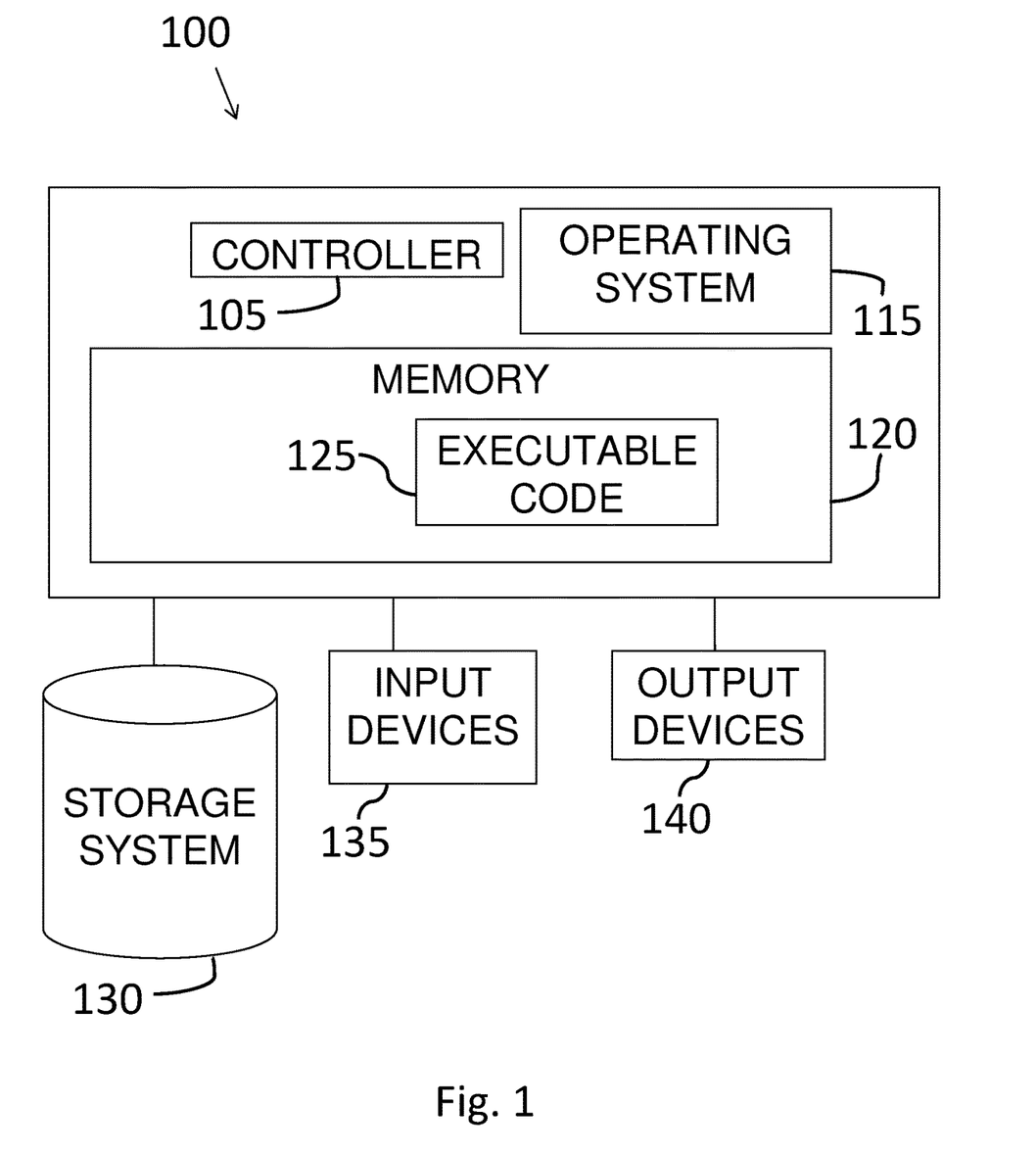
FIG. 1 shows a block diagram of an exemplary computing device, according to some embodiments of the invention.

Reference is made to FIG. 1, which shows a block diagram of an examplary computing device, according to some embodiments of the invention. A device 100 may include a controller 105 that may be, for example, a central processing unit processor (CPU), a chip or any suitable computing or computational device, an operating system 115, a memory 120, executable code 125, a storage system 130 that may include input devices 135 and output devices 140. Controller 105 (or one or more controllers or processors, possibly across multiple units or devices) may be configured to carry out methods described herein, and/or to execute or act as the various modules, units, devices, etc. More than one computing device 100 may be included in, and one or more computing devices 100 may act as the components of, a system according to embodiments of the invention. The computing device or controller of FIG. 1 may act as the various computing devices or controllers of FIG. 2, e.g. the devices communicating on a network, such as IOT devices, etc. or a processor receiving a communication request, etc.

Operating system 115 may be or may include any code segment (e.g., one similar to executable code 125 described herein) designed and/or configured to perform tasks involving coordination, scheduling, arbitration, supervising, controlling or otherwise managing operation of computing device 100, for example, scheduling execution of software programs or tasks or enabling software programs or other modules or units to communicate. Operating system 115 may be a commercial operating system. It will be noted that an operating system 115 may be an optional component, e.g., in some embodiments, a system may include a computing device that does not require or include an operating system 115. For example, a computer system may be, or may include, a microcontroller, an application specific circuit (ASIC), a field programmable array (FPGA) and/or system on a chip (SOC) that may be used without an operating system.

Memory 120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 120 may be or may include a plurality of, possibly different memory units. Memory 120 may be a computer or processor non-transitory readable medium, or a computer non-transitory storage medium, e.g., a RAM.

Executable code 125 may be any executable code, e.g., an application, a program, a process, task or script. Executable code 125 may be executed by controller 105 possibly under control of operating system 115. Although, for the sake of clarity, a single item of executable code 125 is shown in FIG. 1, a system according to some embodiments of the invention may include a plurality of executable code segments similar to executable code 125 that may be loaded into memory 120 and cause controller 105 to carry out methods described herein, or act as the "devices" described herein, or perform other functions.

Storage system 130 may be or may include, for example, a flash memory as known in the art, a memory that is internal to, or embedded in, a micro controller or chip as known in the art, a hard disk drive, a CD-Recordable (CD-R) drive, a Blu-ray disk (BD), a universal serial bus (USB) device or other suitable removable and/or fixed storage unit. Data, such as, a communication request and a predetermined list of allowed device types, may be stored in storage system 130 and may be loaded from storage system 130 into memory 120 where it may be processed by controller 105. In some embodiments, some of the components shown in FIG. 1 may be omitted. For example, memory 120 may be a non-volatile memory having the storage capacity of storage system 130. Accordingly, although shown as a separate component, storage system 130 may be embedded or included in memory 120.

Input devices 135 may be or may include any suitable input devices, components or systems, e.g., a detachable keyboard or keypad, a mouse and the like. Output devices 140 may include one or more (possibly detachable) displays or monitors, speakers and/or any other suitable output devices. Any applicable input/output (I/O) devices may be connected to computing device 100 as shown by blocks 135 and 140. For example, a wired or wireless network interface card (NIC), a universal serial bus (USB) device or external hard drive may be included in input devices 135 and/or output devices 140. It will be recognized that any suitable number of input devices 135 and output device 140 may be operatively connected to computing device 100 as shown by blocks 135 and 140. For example, input devices 135 and output devices 140 may be used by a technician or engineer in order to connect to a computing device 100, update software and the like. Input and/or output devices or components 135 and 140 may be adapted to interface or communicate.

Embodiments of the invention may include an article such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, cause the processor to carry out methods disclosed herein. For example, a storage medium such as memory 120, may include computer-executable instructions such as executable code 125 and a controller such as controller 105 may execute these instructions or executable code 125.

The storage medium may include, but is not limited to, any type of disk including magneto-optical disks, semiconductor devices such as read-only memories (ROMs), random access memories (RAMs), such as a dynamic RAM (DRAM), erasable programmable read-only memories (EPROMs), flash memories, electrically erasable programmable read-only memories (EEPROMs), magnetic or optical cards, or any type of media suitable for storing electronic instructions, including programmable storage devices.

Embodiments of the invention may include components such as, but not limited to, a plurality of central processing units (CPU) or any other suitable multi-purpose or specific processors or controllers (e.g., controllers similar to controller 105), a plurality of input units, a plurality of output units, a plurality of memory units, and a plurality of storage units. A system may additionally include other suitable hardware components and/or software components. In some embodiments, a system may include or may be, for example, a personal computer, a desktop computer, a mobile computer, a laptop computer, a notebook computer, a terminal, a workstation, a server computer, a Personal Digital Assistant (PDA) device, a tablet computer, a network device, or any other suitable computing device.

In some embodiments of the invention, a system may include or may be, for example, a plurality of components that include a respective plurality of central processing units, e.g., a plurality of CPUs as described, a plurality of chips, FPGAs or SOCs, a plurality of computer or network devices, or any other suitable computing device. For example, some embodiments of the invention may include one or more devices such as the computing device 100.

Figure 2:
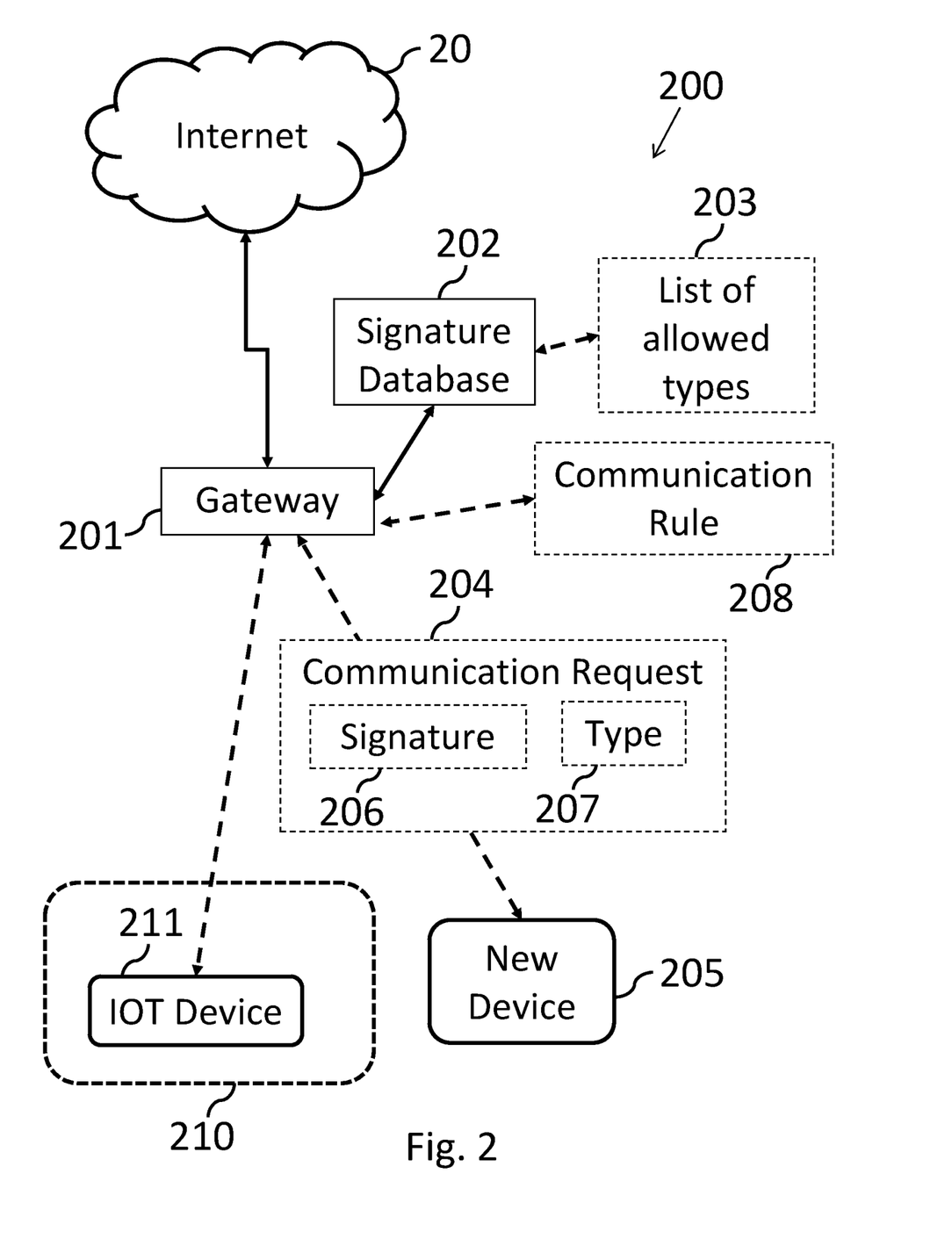
FIG. 2 shows a block diagram of a system for detecting and blocking of malicious attacks on a computer network, according to some embodiments of the invention.

Reference is made to FIG. 2 which shows a block diagram of a device system 200, for detecting and blocking of malicious attacks a computer network 210, according to some embodiments of the invention. The direction of arrows in FIG. 2 may indicate the direction of information flow. In some embodiments, software elements in FIG. 2 are indicated with a dashed line while hardware elements are with a solid line.

According to some embodiments, the computer network 210 (e.g., a wireless computer network) may include a plurality of computing devices (such as computing device 100 as shown in FIG. 1).

The system 200 may include a memory constrained gateway 201 in communication with the computer network 210. In some embodiments, the gateway 201 may be connected to the internet 20. For example, the computer network 210 may include at least one IoT device 211 in communication with the gateway 201 (e.g., gaining access to the internet 20 via the gateway 201).

In some embodiments, the memory constrained gateway 201 may be any gateway (e.g., a server device), for instance used in substantially small networks such as households, with storage capacity of the random-access memory (RAM) in the range of 16-256 megabytes.

The system 200 may apply security protocols via the gateway 201, to block malicious devices from communicating with the computer network 210 and thereby protect all connected devices (e.g., IoT devices) in the network. For example, the system 200 may implement deep packet inspection (DPI) algorithms on devices with restricted processing resources, such as the memory constrained gateway 201. In some embodiments, the system 200 may apply security protocols with DPI on other memory constrained devices in communication with the computer network 210.

The system 200 may include a malicious signature database 202 coupled to the gateway 201. The malicious signature database 202 may include a list of allowed device signatures and/or a predetermined list of allowed devices types 203 which are allowed to communicate with the computer network 210.

For example, the predetermined list of allowed devices types 203 may include a list of smart cameras of a particular manufacturer, and/or a list of smart thermostats of a particular manufacturer, and/or a list of smartphones of a particular model, and/or a list of laptops of a particular model.

In some embodiments, the gateway 201 may receive a communication request 204 from a new device 205 trying to communicate with the computer network 210. While a single new device 205 is shown in FIG. 2, the same may apply with a plurality of devices 205 attempting to communicate with the computer network 210. In some embodiments, the communication request 204 may be received at a gateway server of the computer network 210.

The communication request 204 may include information related to the new device 205, for instance information from dedicated portions of packets transferred during communication over a wireless network. In some embodiments, the communication request 204 may include a signature 206 of the device. In some embodiments, the communication request 204 may include a type 207 of the device.

In some embodiments of the invention, the gateway 201 may identify the type 207 of the device 205 by analyzing the received communication request 204 to apply DPI by inspecting the data packets of the communication request 204. For example, the MAC address of the at least one new device 205 may be determined from the first packet of the communication request 204. Following the receipt of the initial communication request 204, the gateway 201 may capture domain name system (DNS) request and/or traffic patterns from the communication request packets in order to identify the type of the device 205.

According to some embodiments of the invention, the gateway 201 may identify the type 207 of the device 205 based on the received communication request 204 (e.g., based on identified MAC address, DNS, etc.). In some embodiments, operations carried out by the gateway 201 (e.g., identification, verification, etc.) may include instructing a processor to analyze received information (e.g., the received communication request 204) and carry out at least one dedicated algorithm to determine the required outcome (e.g., determine the type of a device).

In some embodiments of the invention, the gateway 201 may verify that the device 205 is of an allowed type from the predetermined list of allowed device types 203. Once the type of the device 205 is verified as of an allowed type by the gateway 201, the device 205 may be considered as an allowed device.

According to some embodiments of the invention, the gateway 201 may check at least one signature 206 of the received communication request 204 of the allowed device 205 to detect malicious signatures. The at least one signature 206 may be determined as malicious when the at least one signature 206 appears in the malicious signature database 202. In some embodiments, the gateway 201 may block communication requests 207 from devices with at least one malicious signature.

According to some embodiments of the invention, the system 200 may provide protection to the computer network 210 via the memory constrained gateway 201 due to at least one of the following: inspection and/or processing of only relevant network traffic for each device, based on identification of the device's type (e.g., device model) of vulnerabilities that exist for that device. In some embodiments, the system 200 may provide protection to the computer network 210 via the memory constrained gateway 201 due to at least one of the following: inspection and/or processing with hardware acceleration mechanisms on the gateway and/or inspection of only relevant portions of the traffic, while the rest is hardware accelerated. In some embodiments, the system 200 may provide protection to the computer network 210 via the memory constrained gateway 201 due to at least one of the following: inspection and/or processing of local traffic (e.g., between devices connected to the same wireless SSID) and/or prioritization of traffic sessions for inspection, based on the severity of possible exploitation.

In some embodiments of the invention, using the system 200 may significantly reduce the amount of processing power required to perform DPI for connected device's traffic (e.g., IoT devices) by reducing an amount of communication request packets that need to be inspected for malicious traffic, therefore allowing the mechanism to be run on less-capable hardware, such as the memory constrained gateway 201 (e.g., home gateways).

For example, in some embodiments, the gateway 201 may receive at least one communication rule 208 corresponding to the identified type, for instance receive the at least one communication rule 208 from a server in communication with the computer network 210. The received at least one communication rule 208 may include condition(s) for inspection, where the received packets may be inspected for at least one of: known vulnerabilities for the identified type, protocol of the at least one device, port number of the at least one device, origin of communication (e.g., communication for inspection may originate at the server or at the device), number of bytes to inspect for each session, predefined signature and priority of the at least one communication rule 208. In some embodiments of the invention, if a received packet does not match a known device, device type, protocol, port number, and/or the origin of communication, the received packet may not be inspected for malicious traffic. Thus, only a portion of the traffic may be inspected, and the required processing resources may be accordingly reduced. For instance, the remaining signatures of uninspected packets may be ignored, such that a limited search may be required for each packet, thereby saving CPU power. In some embodiments of the invention, the gateway 201 may no longer search for signatures in any packet once the device disconnects, therefore saving up CPU power. In some embodiments, the gateway 201 may delete (e.g., flush from the memory) the at least one communication rule 208 once the communication with the device 205 stops (e.g., when the device 205 disconnects from the network), for instance to reduce the memory constrains on the gateway 201.

According to some embodiments, DPI may be implemented on memory constrained gateways using the system 200 by inspecting communication traffic for each new device 205 according to its identified type and/or model (e.g., a printer of a particular manufacturer). When a new device 205 attempts to connect to the computer network 210, the communication request may be identified, and the type of the device may be determined using fingerprinting methods (e.g., determine the type based on identified MAC address, DNS, etc.). Once the type and/or model of the device is identified, a set of communication rules (e.g., DPI rules) for this type may be received (e.g., downloaded). Each such communication rule 208 may include at least one of the following for inspection: protocol, port number, origin or direction of communication (e.g., device to server or server to device), signature (e.g., a sequence of data to be searched in the traffic), number of bytes to inspect of each session, and/or priority of this rule. While the device 205 attempt to communicate with the computer network and/or while the device 205 is connected (e.g., such as IoT device 211), its traffic may be inspected according to those communication rules 208.

In some embodiments, if too many DPI communication rules are inspected simultaneously (e.g., if many vulnerable devices are connected to the network at once), they may be prioritized according to their given priority. The least important devices may not be inspected, therefore relieving memory and processing power. The priority of each communication rule may be given according to the severity of possible exploitation. For example, an exploit allowing the attacker to gain full control of the remote machine may be given the highest priority. An exploit allowing only partial information disclosure may be given lower priority.

In some embodiments, the gateway may initiate automatic deep packet inspection of the received communication request.

Figure 3:
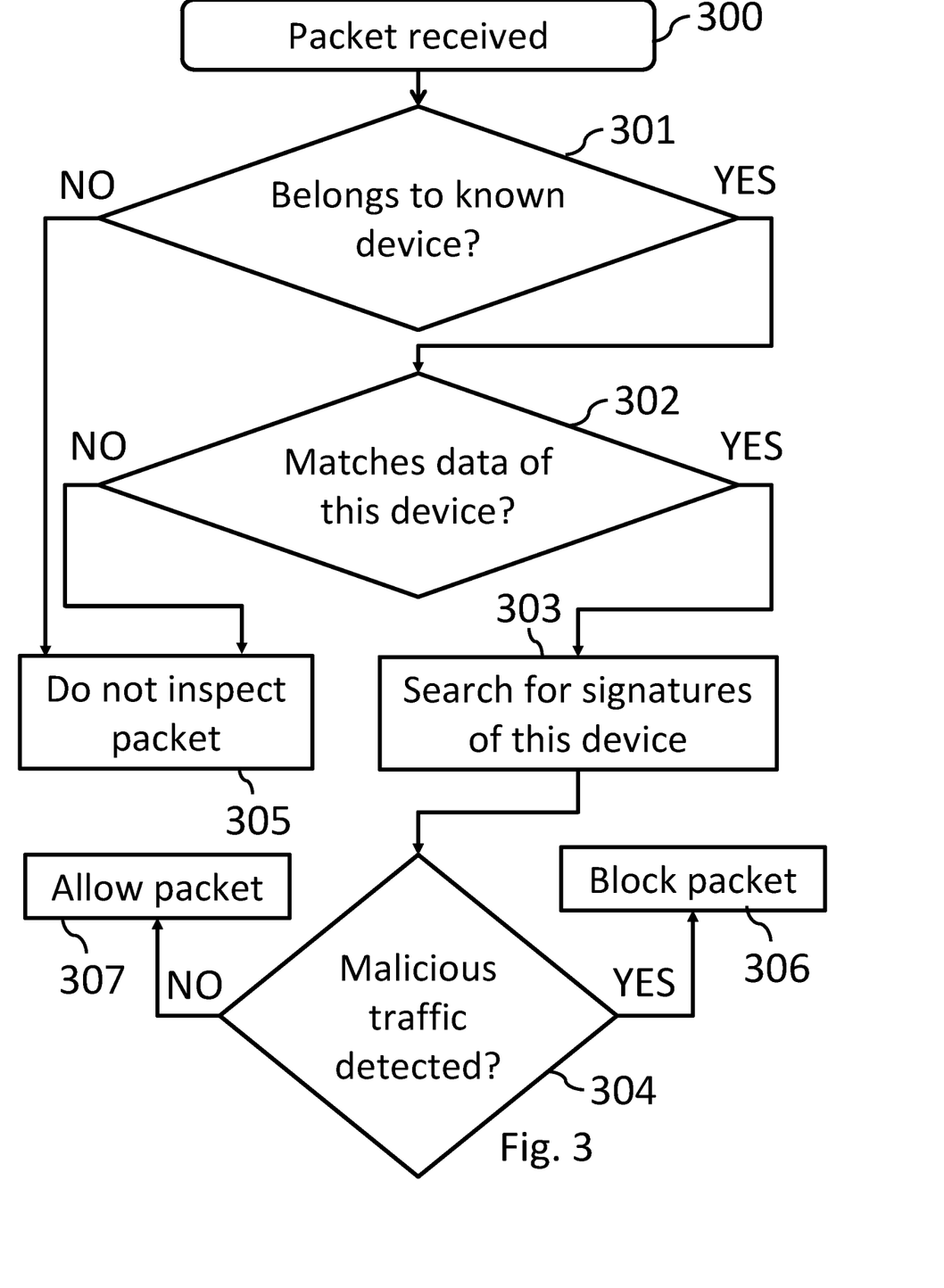
FIG. 3 shows a flow chart of a method of detecting malicious traffic, according to some embodiments of the invention.

Reference is made to FIG. 3 which shows a flow chart of a method of detecting malicious traffic, according to some embodiments of the invention. In step 300, a gateway (e.g., the gateway 201 of FIG. 2) may receive a packet of a communication request (e.g., the communication request 204 of FIG. 2). In step 301, the gateway may check whether the packet belongs to a previously allowed device. For example, the gateway may determine if the device was previously allowed by checking a list of allowed devices based on device parameters (e.g., IP address) and/or based on a check that an identified type, from the communication request, belongs to one of the allowed types for devices. If the device was not previously allowed, then the gateway does not inspect the packet in step 305.

In step 302, if the packet belongs to a previously allowed device, then the gateway may determine if the device from which the gateway received the packet matches data of a previously allowed device (e.g., match in the required protocol and/or port number and/or direction). If the packet does not match data of a previously allowed device (in Step 302), in step 305, the gateway may not inspect the packet for malicious traffic. Accordingly, processing power (e.g., of the gateway) may be saved by not inspecting non-relevant packets. In step 303, if the device matches data of a previously allowed device (in Step 302), then the gateway may only search for signatures for the matched device's type in the packets, for instance before malicious traffic is inspected in step 304. The rest of the signatures may be ignored for this packet, thereby performing only limited search in each packet, and accordingly saving processing power. In some embodiments of the invention, only the first bytes (of a data packet) of each network session may be searched for malicious traffic, thereby also saving processing resources.

If malicious traffic is detected in step 304, the communication request may be blocked, and the packet dropped in Step 306. In step 307, if malicious traffic is not detected in step 304, the communication request may be allowed. In some embodiments of the invention, once the device disconnects, the signatures may no longer be searched for in any packet, therefore saving up processing resources. In some embodiments of the invention, the received (e.g., downloaded) communication rule may be flushed or deleted from memory, also to save up memory space.

Figure 4:
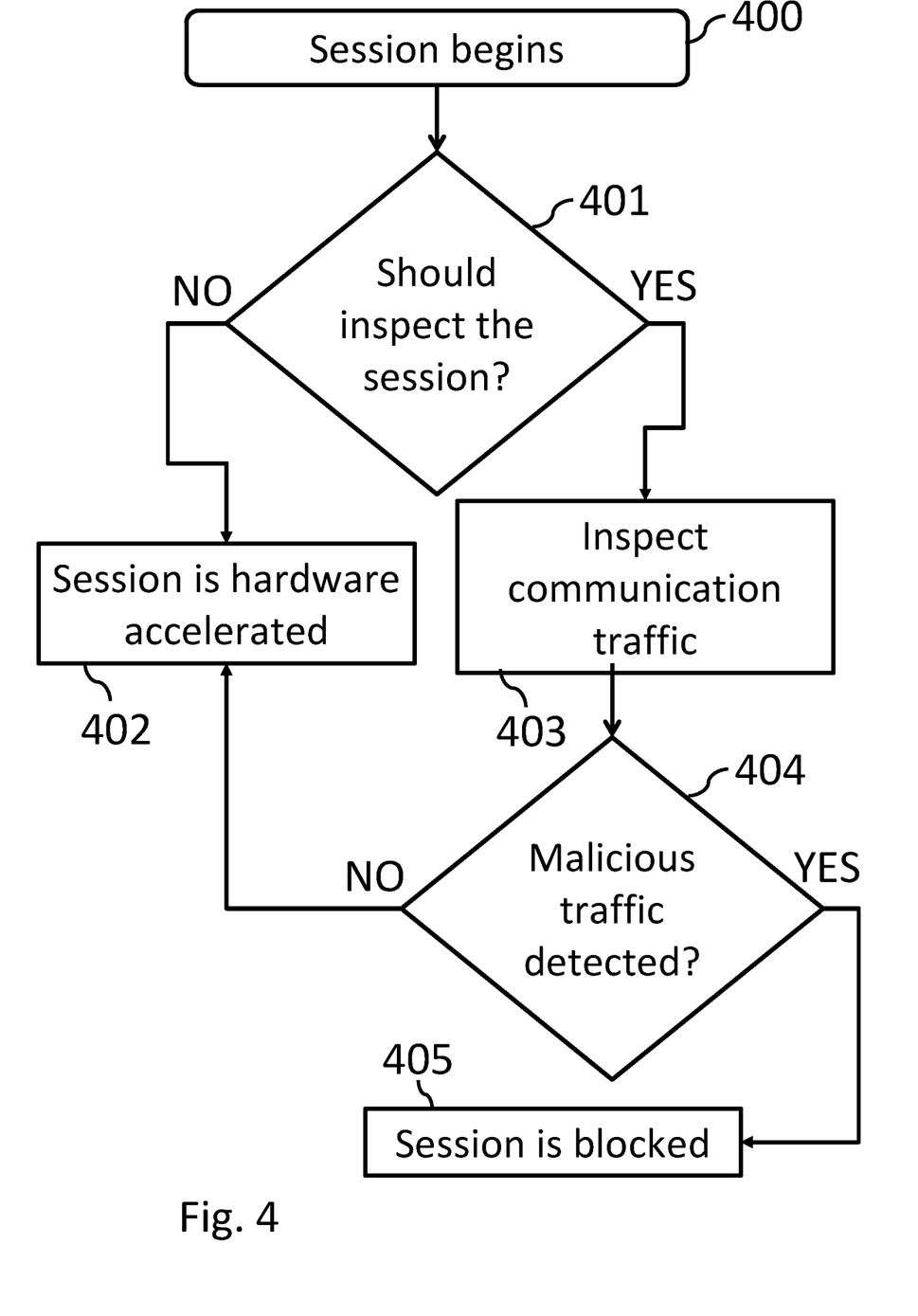
FIG. 4 shows a flow chart of a method of detecting malicious traffic with hardware acceleration, according to some embodiments of the invention.

Reference is made to FIG. 4 which shows a flow chart of a method of detecting malicious traffic with hardware acceleration, according to some embodiments of the invention. Some gateways (e.g., in households) may have a hardware acceleration mechanism where only the first packets of each session are passed to the CPU. The rest of the packets may be processed using dedicated hardware elements and/or a secondary network CPU.

In step 400, a communication session between the new device and a gateway (e.g., the gateway 201 of FIG. 2) may begin by, for instance identifying a communication request at the gateway. For example, the communication session may include a Transmission Control Protocol (TCP) and/or a User Datagram Protocol (UDP) protocol.

In step 401, the gateway may determine if the communication request may be checking if the communication session should be inspected according to metadata of the protocol (e.g., TCP and/or UDP) of the communication session and/or according to the method described in FIG. 3.

If the session is not to be inspected (in Step 401), in step 402, the communication session may proceed to hardware acceleration, as in normal procedure for instance without DPI inspection. If the session is to be inspected (in Step 401), in step 403, the gateway may remove the communication data from hardware acceleration and inspect the communication data, according to the method described in FIG. 3, to determine, in step 404, if the gateway detects a presence of malicious traffic. In some embodiments of the invention, only communication packets in a particular communication direction may be removed from the hardware acceleration.

In some embodiments, if some number of bytes is sent in the session, the session may be moved back to the hardware acceleration mechanism (in Step 402). If malicious traffic is detected (in Step 404) in those bytes, in step 405, the gateway may block the session. By utilizing the hardware acceleration as much as possible, the load on the processing resources of the gateway may be significantly reduced.

Figure 5:
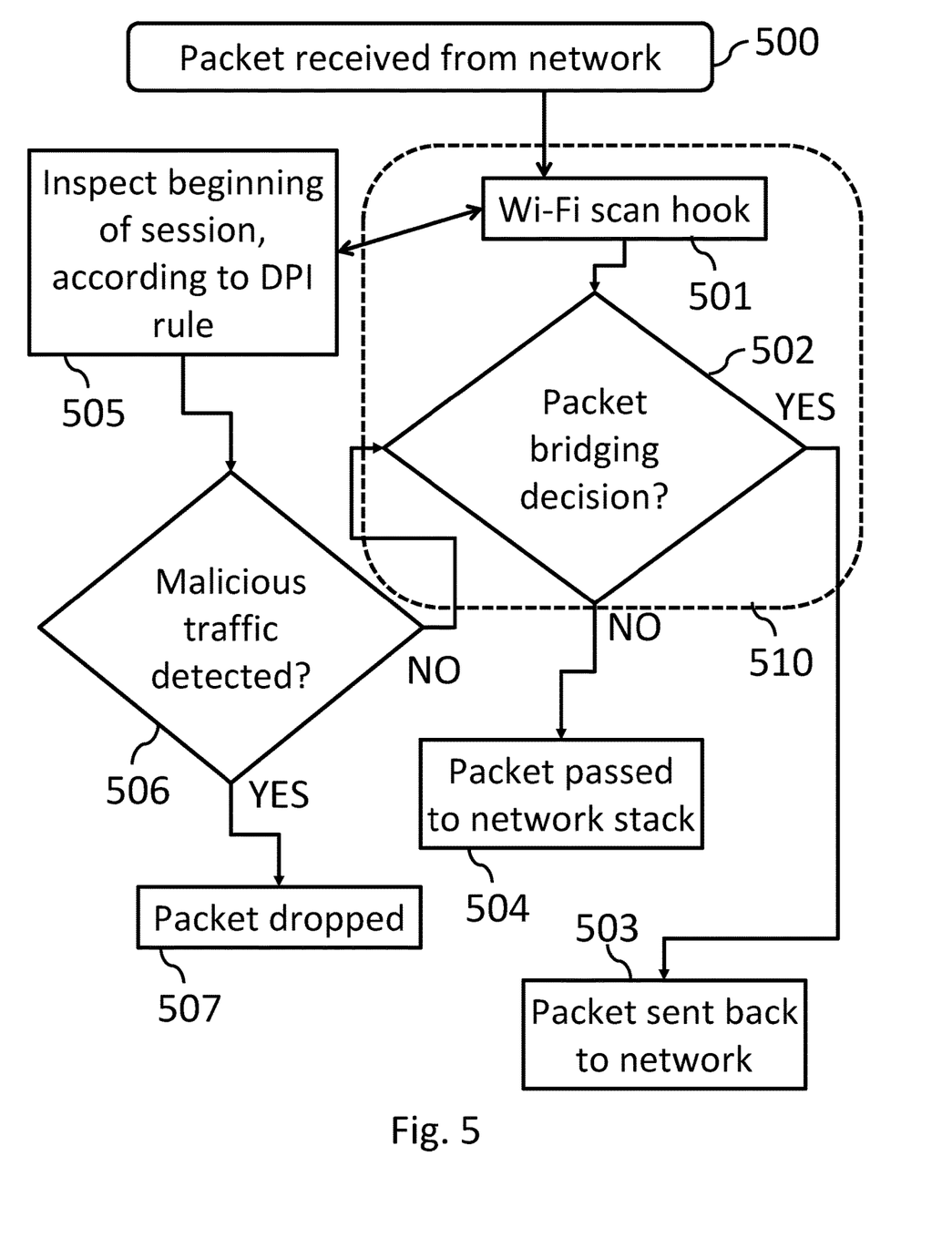
FIG. 5 shows a flow chart of a method of detecting malicious traffic with local layer inspection, according to some embodiments of the invention.

Reference is made to FIG. 5 which shows a flow chart of a method of detecting malicious traffic with local layer (e.g., LAN traffic for Wi-Fi connected devices) inspection, according to some embodiments of the invention.

In step 500, a packet received from the computer network, for instance a Wi-Fi network. In step 501, the packet may be passed (e.g., by the gateway) directly to a Wi-Fi 802.11 stack of the operating system according to a bridging decision. In step 502, the gateway may make a bridging decision either to send the packet back to the network (in Step 503), or to pass it to the operating system's IP stack (in Step 504). If the traffic is sent back to the network (in Step 503) following the bridging decision, it may be invisible to the above layers of the operating system and therefore cannot be inspected using previous methods.

In some embodiments of the invention, a scan hook may be added (in Step 501) before the bridging decision is made (in Step 502), to pass the communication packet for inspection according to the relevant DPI communication rules (in Step 505). The communication packet may be thus checked for malicious traffic (in Step 506). If the packet includes malicious traffic the packet may be dropped (in Step 507), for instance the packet may be dropped when blocked by the gateway. If the packet does not include malicious traffic the packet may be passed back to the bridging decision (in Step 502) of the 802.11 stack 510.

Figure 6:
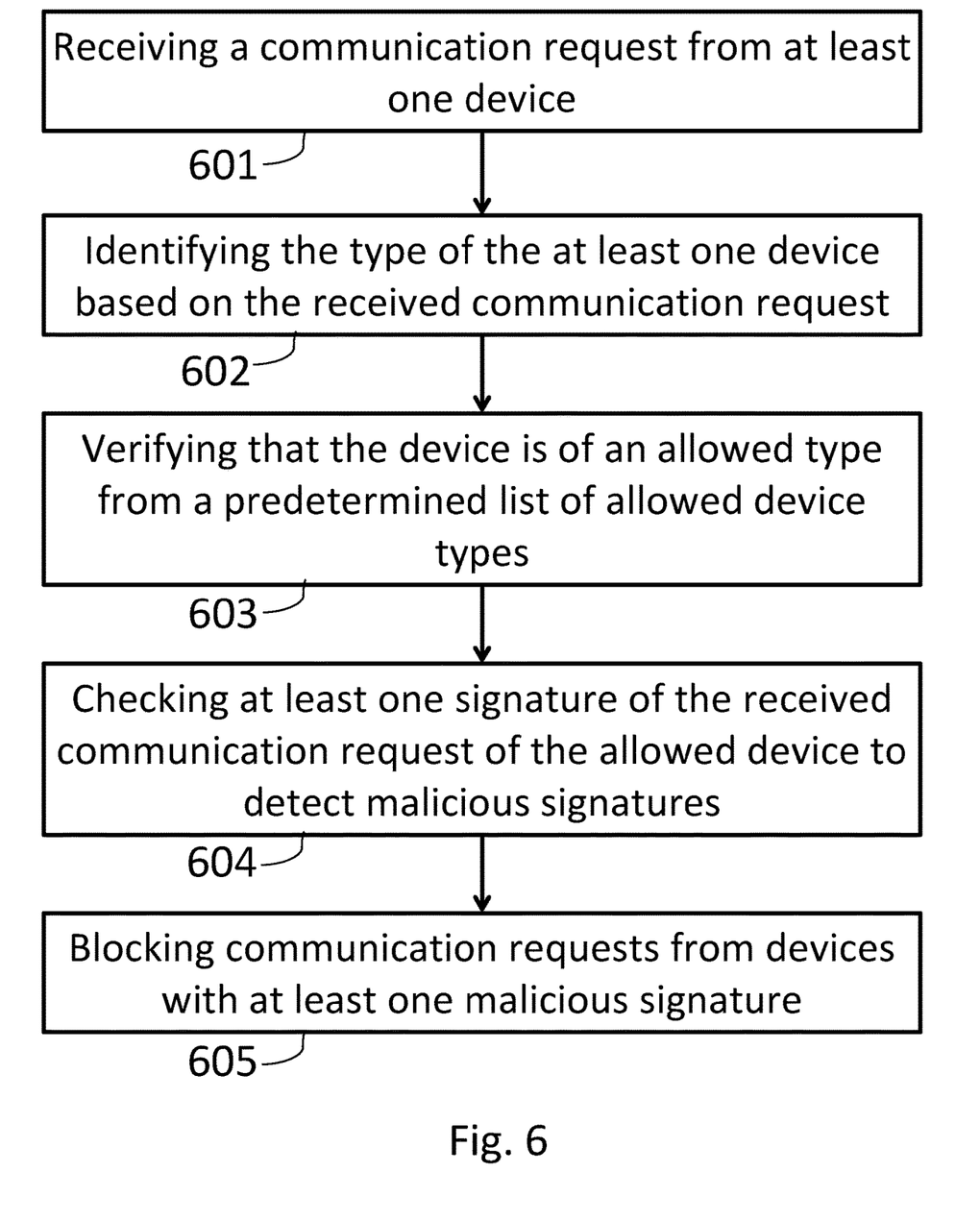
FIG. 6 shows a flow chart of a method of detecting and blocking malicious attacks on a computer network, according to some embodiments of the invention.

Reference is made to FIG. 6 which shows a flow chart of a method of detecting and blocking malicious attacks on a computer network, according to some embodiments of the invention.

In step 601, communication request (e.g., the communication request 204 of FIG. 2) from at least one device (e.g., the device 205 of FIG. 2) may be received by a memory constrained gateway (e.g., the memory constrained gateway 201 of FIG. 2) in communication with the computer network (e.g., the computer network 210 of FIG. 2). In step 602, the gateway may identify the type of the at least one device based on the received communication request. In step 603, the gateway may verify that the device is of an allowed type from a predetermined list of allowed device types (e.g., the predetermined list of allowed device types 203 of FIG. 2).

In some embodiments of the invention, the gateway may check at least one signature of the received communication request of the allowed device to detect malicious signatures (in Step 604), and/or block communication requests from devices with at least one malicious signature (in Step 605). In some embodiments of the invention, the at least one signature may be determined as malicious when the at least one signature appears in a malicious signature database (e.g., the malicious signature database 202 of FIG. 2) coupled to the gateway. In some embodiments of the invention, the predetermined list may include device types that are allowed to communicate with the computer network.

Unless explicitly stated, the method embodiments described herein are not constrained to a particular order in time or chronological sequence. Additionally, some of the described method elements may be skipped, or they may be repeated, during a sequence of operations of a method.

Various embodiments have been presented. Each of these embodiments may of course include features from other embodiments presented, and embodiments not specifically described may include various features described herein.

The invention claimed is:

1. A method comprising:
 receiving, by a memory constrained gateway in communication with a computer network, a communication request from at least one unverified device to communicate in the computer network;
  wherein the communication request comprises at least one signature and at least one device type;
 receiving, by the memory constrained gateway, at least one communication rule based on the at least one device type;
  wherein the at least one communication rule comprises at least one deep packet inspection (DPI) rule with at least one condition for inspecting data traffic, at least one security protocol, or any combination thereof;
 utilizing, by the memory constrained gateway, at least one processing-efficient DPI algorithm based on the at least one DPI rule for the at least one device type of the at least one unverified device to perform a determination, based on an inspection of data packets in the at least one signature for malicious content, when to:
  allow the at least one unverified device to communicate in the computer network as a trusted device, or
  block the at least one unverified device to communicate in the computer network as a potentially malicious device; and
 reducing, by the memory constrained gateway, memory usage, processing power, or both in the memory constrained gateway during the determination by performing at least one of:
  (i) limiting the inspection of the data packets in the at least one signature to a portion of the data packets based on the at least one condition for inspecting data traffic;
  (ii) reducing a number of data packets for the inspection of the at least one signature in the communication request of the at least one unverified device;
  (iii) prioritizing the at least one communication rule for the at least one unverified device for the inspection of the at least one signature, based on a severity of possible exploitation, when more than one unverified device from the at least one unverified device is connected to the computer network at once; or
  (iv) flushing the at least one communication rule from a memory of the memory constrained gateway.

2. The method of claim 1, further comprising determining, by the memory constrained gateway, that the at least one device type in the communication request of the at least one unverified device is an allowed device type to communicate on the computer network.

3. The method of claim 1, wherein the at least one device type is an allowed device type; and
 further comprising determining, by the memory constrained gateway, from data packets in the at least one signature that at least one of port number and origin of communication of the at least one unverified device corresponds to the allowed device type to permit the at least one unverified device to communicate on the computer network.

4. The method of claim 1, further comprising blocking, by the memory constrained gateway, the at least one unverified device to communicate over the computer network when the at least one unverified device is unidentified as having an allowed device type.

5. The method of claim 1,
 wherein the at least one communication rule comprises at least one condition for the inspection; and
 wherein the at least one condition for the inspection comprises at least one of: known vulnerabilities for the at least one device type, protocol of the at least one unverified device, port number of the at least one unverified device, an origin of communication, a number of bytes to inspect for each session, and a priority of the at least one communication rule.

6. The method of claim 1, wherein the receiving of the at least one communication rule comprises receiving the at least one communication rule from a gateway server in communication with the computer network.

7. The method of claim 1, further comprising deleting, by the memory constrained gateway, the at least one communication rule once the at least one unverified device stops to communicate over the computer network.

8. The method of claim 1, further comprising, by the memory constrained gateway, initiating hardware acceleration.

9. The method according to claim 1, further comprising blocking, by the memory constrained gateway, the at least one unverified device to communicate in the computer network when determining that the at least one signature appears in a malicious signature database.

10. A system, comprising:
 a memory constrained gateway in communication with a computer network; and
 a malicious signature database coupled to the memory constrained gateway;
 wherein the memory constrained gateway is configured to:
  receive a communication request from at least one unverified device to communicate in the computer network;
   wherein the communication request comprises at least one signature and at least one device type;
  receive at least one communication rule based on the at least one device type;
   wherein the at least one communication rule comprises at least one deep packet inspection (DPI) rule with at least one condition for inspecting data traffic, at least one security protocol, or any combination thereof;
  utilize at least one processing-efficient DPI algorithm based on the at least one DPI rule for the at least one device type of the at least one unverified device to perform a determination, based on an inspection of data packets in the at least one signature for malicious content, when to:
   allow the at least one unverified device to communicate in the computer network as a trusted device, or
   block the at least one unverified devices to communicate in the computer network as a potentially malicious device; and reduce memory usage, processing power, or both in the memory constrained gateway during the determination by performing at least one of:
   (i) to limit the inspection of the data packets in the at least one signature to a portion of the data packets based on the at least one condition for inspecting data traffic;
   (ii) to reduce a number of data packets for the inspection of the at least one signature in the communication request of the at least one unverified device;
   (iii) to prioritize the at least one communication rule for the at least one unverified device for the inspection of the at least one signature, based on a severity of possible exploitation, when more than one unverified device from the at least one unverified device is connected to the computer network at once; or
   (iv) to flush the at least one communication rule from a memory of the memory constrained gateway.

11. The system of claim 10, wherein the memory constrained gateway is further configured to determine that the at least one device type in the communication request of the at least one unverified device is an allowed device type to communicate on the computer network.

12. The system of claim 10, wherein the at least one device type is an allowed device type; and
   wherein the memory constrained gateway is further configured to determine from data packets in the at least one signature that at least one of port number and origin of communication of the at least one unverified device corresponds to the allowed device type to permit the at least one unverified device to communicate on the computer network.

13. The system of claim 10, wherein the memory constrained gateway is further configured to block the at least one unverified device to communicate over the computer network when the at least one unverified device is unidentified as having an allowed device type.

14. The system of claim 10,
   wherein the at least one communication rule comprises at least one condition for the inspection; and
   wherein the at least one condition for the inspection comprises at least one of: known vulnerabilities for the at least one device type, protocol of the at least one unverified device, port number of the at least one unverified device, an origin of communication, a number of bytes to inspect for each session, and a priority of the at least one communication rule.

15. The system of claim 10, wherein the memory constrained gateway is further configured to receive the at least one communication rule by receiving the at least one communication rule from a gateway server in communication with the computer network.

16. The system of claim 10, wherein the memory constrained gateway is further configured to delete the at least one communication rule once the at least one unverified device stops to communicate over the computer network.

17. The system of claim 10, wherein the memory constrained gateway is further configured to initiate hardware acceleration.

18. The system according to claim 10, wherein the memory constrained gateway is further configured to block the at least one unverified device to communicate in the computer network when determining that the at least one signature appears in the malicious signature database.

* * * * *